(12) United States Patent
Ho et al.

(10) Patent No.: US 10,507,640 B2
(45) Date of Patent: Dec. 17, 2019

(54) THREE-DIMENSIONAL PRINTER

(71) Applicants: XYZPRINTING, INC., New Taipei (TW); KINPO ELECTRONICS, INC., New Taipei (TW)

(72) Inventors: Ming-En Ho, New Taipei (TW); Yang-Teh Lee, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 295 days.

(21) Appl. No.: 15/164,353

(22) Filed: May 25, 2016

(65) Prior Publication Data

US 2017/0259506 A1   Sep. 14, 2017

(30) Foreign Application Priority Data

Mar. 8, 2016 (CN) .......................... 2016 1 0129906

(51) Int. Cl.
*B29C 37/00* (2006.01)
*B21K 5/00* (2006.01)
(Continued)

(52) U.S. Cl.
CPC .......... *B33Y 30/00* (2014.12); *B29C 37/0025* (2013.01); *B29C 64/209* (2017.08);
(Continued)

(58) Field of Classification Search
CPC ......... B33Y 30/00; B33Y 10/00; B33Y 50/02; B33Y 40/00; B29C 64/227; B29C 64/209;
(Continued)

(56) References Cited

U.S. PATENT DOCUMENTS

| 8,827,684 B1* | 9/2014 | Schumacher | B29C 64/20 |
|---|---|---|---|
| | | | 425/375 |
| 10,022,970 B2* | 7/2018 | Okina | B41J 2/14201 |
| 2012/0120150 A1* | 5/2012 | Ando | B41J 2/165 |
| | | | 347/22 |

FOREIGN PATENT DOCUMENTS

| CN | 204585856 U | 8/2015 |
| CN | 205310839 U | 6/2016 |

(Continued)

OTHER PUBLICATIONS

Office Action dated Nov. 27, 2018 of the corresponding Japan patent application.

(Continued)

*Primary Examiner* — Michael N Orlando
*Assistant Examiner* — Christian Roldan
(74) *Attorney, Agent, or Firm* — Chun-Ming Shih; HDLS IPR Services

(57) ABSTRACT

A three-dimensional printer includes: a machine mainframe, formed with a carrying plane; a three-dimensional printing module, installed on the machine mainframe, and used for forming a three-dimensional object on the carrying plane according to a three-dimensional model data; and a color spraying nozzle module, installed on the machine mainframe and used for coloring a surface of the three-dimensional object according to the three-dimensional model data, wherein the color spraying nozzle module includes at least one color spraying nozzle and at least one screen member, the color spraying nozzle is formed with at least one nozzle hole, the screen member is formed with at least one screen hole, the screen hole is arranged corresponding to the nozzle hole, and the area of the screen hole is smaller than the area (Continued)

of the nozzle hole thereby enabling the color spraying nozzle module to more efficiently color the three-dimensional object.

19 Claims, 16 Drawing Sheets

(51) Int. Cl.
*B33Y 30/00* (2015.01)
*B29C 64/227* (2017.01)
*B29C 64/209* (2017.01)
*B33Y 40/00* (2015.01)
*B33Y 50/02* (2015.01)
*B29K 105/00* (2006.01)
*B29C 64/112* (2017.01)
*B33Y 10/00* (2015.01)

(52) U.S. Cl.
CPC .......... *B29C 64/227* (2017.08); *B29C 64/112* (2017.08); *B29C 2795/007* (2013.01); *B29K 2105/0058* (2013.01); *B33Y 10/00* (2014.12); *B33Y 40/00* (2014.12); *B33Y 50/02* (2014.12)

(58) Field of Classification Search
CPC .......... B29C 37/0025; B29C 2795/007; B29C 64/112; B29K 2105/0058
USPC ....................................................... 425/162
See application file for complete search history.

(56) References Cited

FOREIGN PATENT DOCUMENTS

| | | |
|---|---|---|
| JP | 2001334581 A | 12/2001 |
| JP | 2017052192 A | 3/2017 |
| KR | 20050094234 A | 9/2005 |
| WO | 2016003277 A1 | 1/2016 |

OTHER PUBLICATIONS

Office Action dated Dec. 19, 2017 of the corresponding Taiwan patent application.
Office Action dated May 16, 2019 of the corresponding Korean patent application.

* cited by examiner

THREE-DIMENSIONAL PRINTER

BACKGROUND OF THE INVENTION

Field of the Invention

The present invention relates to a printer, especially to a three-dimensional printer.

Description of Related Art

The three-dimensional printing is one of the technologies for fast formation and can be applied on laminating materials such as metal powders or plastic; with a means of gradually depositing multiple layers for forming an object, a depositing fabrication is provided. As present, toy components, mechanical components or human bone pieces can all be fabricated by utilizing the three-dimensional printing, so that the three-dimensional printing has become one of the commonly-known technologies.

In addition, the color of a three-dimensional printing finished product is mostly the color of the laminating material itself such as metal powders or plastic, if the three-dimensional printing finished product is required to be provided with multiple colors, a color printing nozzle is needed for coloring the three-dimensional printing finished product, so that the three-dimensional printing finished product can be provided with a colorful appearance.

However, a conventional color printing nozzle has following disadvantages: because the three-dimensional printing finished product is fabricated through a means of depositing multiple layers, the color printing nozzle only has to be used for coloring the outer periphery of the three-dimensional printing finished product, but the dimension of the ejecting port of the conventional color printing nozzle is overly large and the ejecting angle is overly wide, the paint may be distributed to other areas of the three-dimensional printing finished product, thus the three-dimensional printing finished product would have shortages of not being precisely colored or the color not being evenly distributed.

Accordingly, the applicant of the present invention has devoted himself for improving the mentioned disadvantages.

SUMMARY OF THE INVENTION

The present invention is to provide a three-dimensional printer, which has advantages of depositing and forming a three-dimensional object and coloring the three-dimensional object at the same time, and the area of a screen hole is smaller than the area of a nozzle hole of a color spraying nozzle, so that a color spraying nozzle module is able to more efficiently and conveniently color the three-dimensional object.

Accordingly, the present invention provides a three-dimensional printer used for forming a three-dimensional object; the three-dimensional printer comprises: a machine mainframe, formed with a carrying plane; a three-dimensional printing module, installed on the machine mainframe, and used for forming the three-dimensional object on the carrying plane according to a three-dimensional model data; and a color spraying nozzle module, installed on the machine mainframe and used for coloring a surface of the three-dimensional object according to the three-dimensional model data, wherein the color spraying nozzle module includes at least one color spraying nozzle and at least one screen member, the color spraying nozzle is formed with at least one nozzle hole, the screen member is formed with at least one screen hole, the screen hole is arranged corresponding to the nozzle hole, and the area of the screen hole is smaller than the area of the nozzle hole.

Based on what has been disclosed above, because the screen hole is arranged corresponding to the nozzle hole and the area of the screen hole is smaller than the area of the nozzle hole, the screen hole is able to reduce the coloring area and angle of the nozzle hole, so that the color spraying nozzle is enabled to more efficiently and conveniently color the outer surface of each layer of the three-dimensional object.

Based on what has been disclosed above, the three-dimensional printing module includes a moving unit and a three-dimensional printing nozzle, the three-dimensional printing nozzle is fastened on the moving unit, so the three-dimensional printing nozzle and the color spraying nozzle are together fastened on the moving unit and moved with the moving unit, thereby enabling the three-dimensional printer provided by the present invention to more rapidly deposit and color the three-dimensional object.

Based on what has been disclosed above, the screen member includes an adjusting structure, and the screen member can utilize the adjusting structure to adjust the dimension of the screen hole arranged corresponding to the nozzle hole so as to adjust the coloring area and angle of the nozzle hole, thereby allowing the three-dimensional printer to be provided with an advantage of precisely spraying and coating.

Based on what has been disclosed above, the three-dimensional printer further includes a cover structure, and the cover structure is able to partially cover, fully cover or fully expose the plural screen holes, thereby limiting the colors and quantity of the nozzle holes for satisfying a desired coloring plan.

DETAILED DESCRIPTION OF THE INVENTION

Preferred embodiments of the present invention will be described with reference to the drawings.

Figure 1:
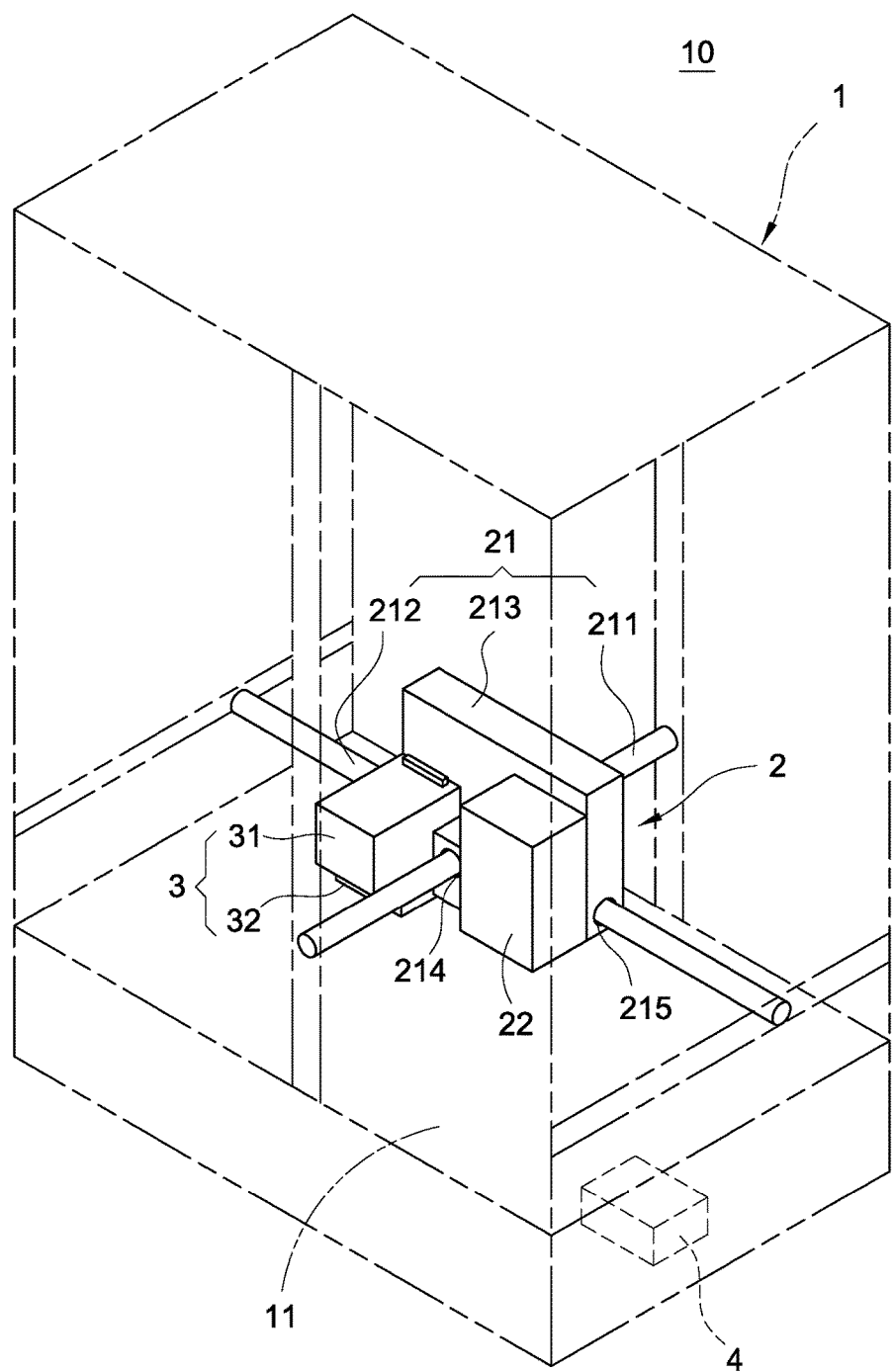
FIG. 1 is a schematic view showing the assembly of a three-dimensional printer according to a first embodiment of the present invention.
Figure 2:
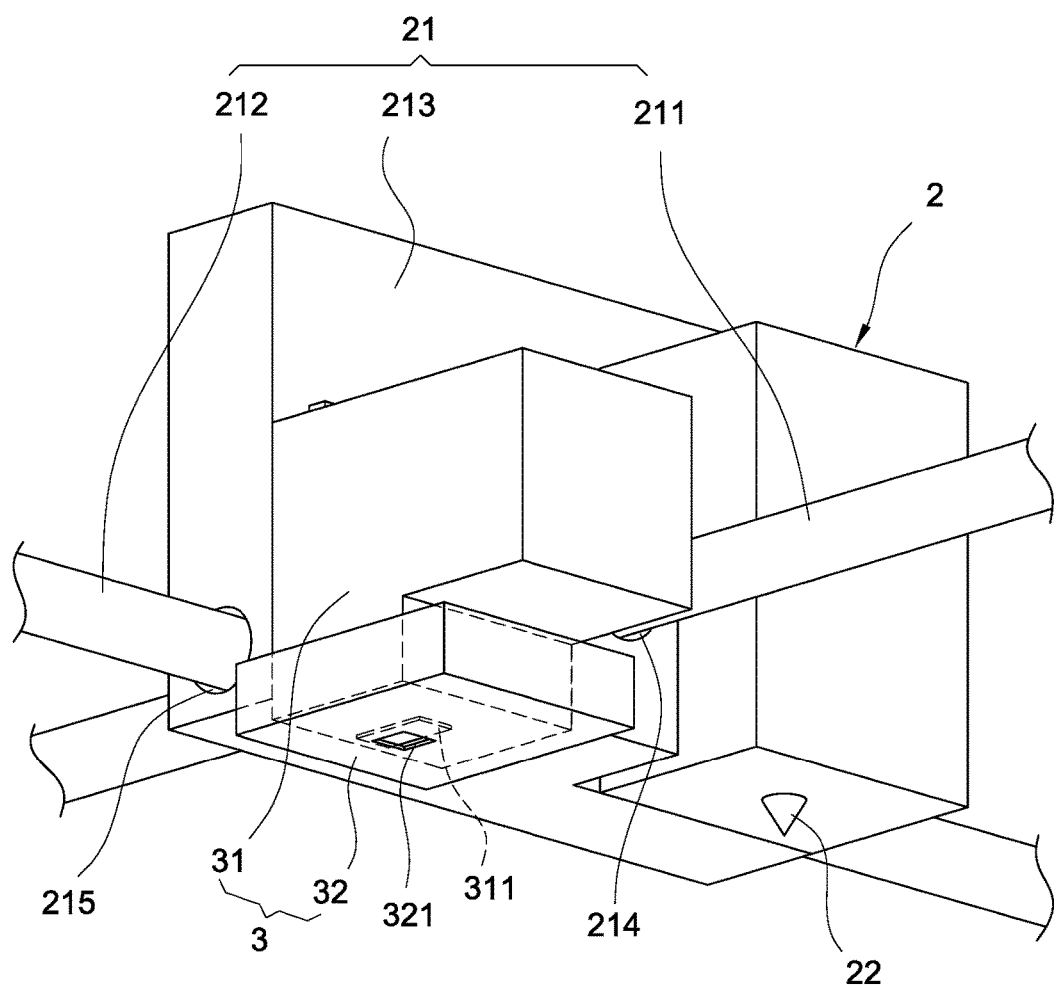
FIG. 2 is a perspective view showing the three-dimensional printer according to the first embodiment of the present invention.
Figure 3:
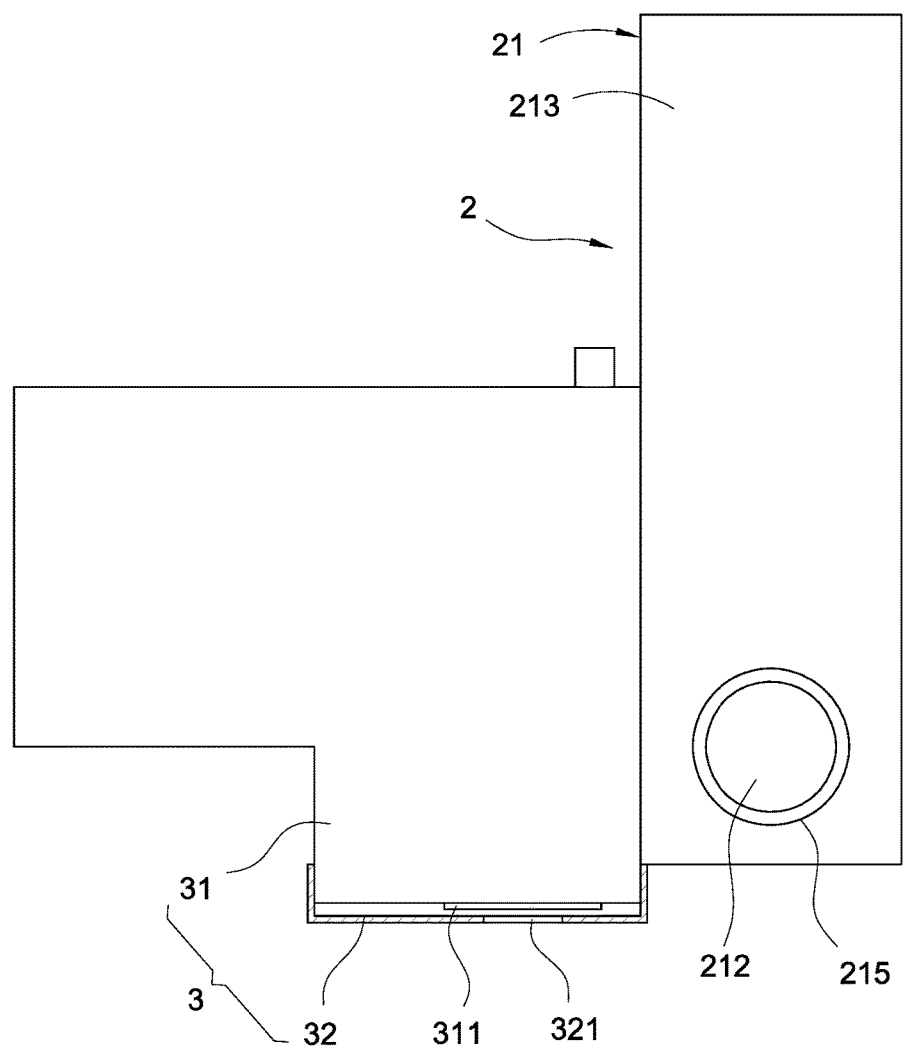
FIG. 3 is a cross sectional view showing a color spraying nozzle module according to the first embodiment of the present invention.

Please refer to FIG. 1, which discloses a first embodiment of a three-dimensional printer provided by the present invention. The three-dimensional printer 10 mainly comprises a machine mainframe 1, a three-dimensional printing module 2 and a color spraying nozzle module 3.

As shown in FIG. 1, the machine mainframe 1 is formed with a carrying plane 11, according to this embodiment, the three-dimensional printer 10 is a fused filament fabrication (FFF) three-dimensional printer, but what shall be addressed is that the scope of the present invention is not limited to the above-mentioned disclosure, the three-dimensional printer 10 can also be other three-dimensional printers such as stereolithography apparatus (SLA), selective laser sintering (SLS), laminated object manufacturing (LOM) and three dimensional printing (3DP).

Please refer from FIG. 1 to FIG. 4, the three-dimensional printing module 2 is installed on the machine mainframe 1, and used for forming a three-dimensional object 100 on the carrying plane 11 according to a three-dimensional model data. The three-dimensional printing module 2 includes a moving unit 21 and a three-dimensional printing nozzle 22, the moving unit 21 is installed on the machine mainframe 1, and the three-dimensional printing nozzle 22 is fastened on the moving unit 21 and moved with the moving unit 21.

Details are provided as follows. The moving unit 21 includes a first rod member 211, a second rod member 212 and a nozzle carrier 213. The nozzle carrier 213 is formed with a first hole 214 and a second hole 215 which are perpendicular to each other, the first rod member 211 is sleeved in the first hole 214 and capable of sliding therein, the second rod member 212 is sleeved in the second hole 215 and capable of sliding therein, and the three-dimensional printing nozzle 22 is fastened on the nozzle carrier 213 and moved with the nozzle carrier 213.

Wherein, the first rod member 211 is defined as one of an X axis rod or a Y axis rod, the second rod member 212 is defined as one of the X axis rod or the Y axis rod, the first hole 214 and the second hole 215 are respectively defined as corresponding axial holes, and the nozzle carrier 213 is able to be driven through a belt to slide relative to the first rod member 211 and the second rod member 212. In addition, the first rod member 211 is defined as one of a X screw rod or a Y screw rod, the second rod member 212 is defined as one of the X screw rod or the Y screw rod, the first hole 214 and the second hole 215 are respectively defined as corresponding screw holes, and the nozzle carrier 213 is able to be driven through a screw transmission formed by a screw rod and a screw hole to slide relative to the first rod member 211 and the second rod member 212.

As shown from FIG. 1 to FIG. 4, the color spraying nozzle module 3 is installed on the machine mainframe 1, and used for coloring a surface of the three-dimensional object 100 according to the above-mentioned three-dimensional model data, and the color spraying nozzle module 3 includes one or a plurality of color spraying nozzles 31 and one or a plurality of screen members 32. Wherein, according to this embodiment, the quantity of the color spraying nozzle 31 and the quantity of the screen member 32 are both one, but what shall be addressed is that the scope of the present invention is not limited to the above-mentioned arrangement.

The color spraying nozzle 31 is formed with one or a plurality of nozzle holes 311, and the screen member 32 is formed with one or a plurality of screen holes 321. Wherein, according to this embodiment, the quantity of the nozzle hole 311 on the same color spraying nozzle 31 is one, the quantity of the screen hole 321 on the same screen member 32 is one, but what shall be addressed is that the scope of the present invention is not limited to the above-mentioned arrangement, the nozzle hole 311 can be a nozzle hole spraying single color or multiple colors.

In addition, the screen hole 321 is arranged corresponding to the nozzle hole 311, and the area of the screen hole 321 is smaller than the area of the nozzle hole 311. Wherein, the length of the screen hole 321 is smaller than the length of the nozzle hole 211, the width of the screen hole 321 is smaller than the width of the nozzle hole 311, the length and the width of the screen hole 321 can be manually or electrically adjusted for allowing the screen hole to be adjusted to a smaller area, so that the coloring location of a printing object can be more precisely colored. Further illustrations are provided as follows. The color spraying nozzle 31 is fastened on and carried by the moving unit 21 so as to be moved with the moving unit 21, in other words the color spraying nozzle 31 is fastened on the nozzle carrier 213 and moved with the nozzle carrier 213, and the screen member 32 is fastened on the color spraying nozzle 31 and served to cover the color spraying nozzle 31.

As shown in FIG. 1, the three-dimensional printer 10 provided by the present invention further comprises a processor 4 which is respectively and electrically connected to the three-dimensional printing module 2 and the color spraying nozzle module 3, and the processor 4 is used for receiving the above-mentioned three-dimensional model data for calculating the color printing route of the color spraying nozzle 31.

As shown from FIG. 1 to FIG. 4, the assembly of the three-dimensional printer 10 provided by the present invention is that: the machine mainframe 1 is formed with the carrying plane 11; the three-dimensional printing module 2 is installed on the machine mainframe 1 and used for forming the three-dimensional object 100 on the carrying plane 11 according to the three-dimensional model data; the color spraying nozzle module 3 is installed on the machine mainframe 1 and used for coloring the surface of the three-dimensional object 100 according to the above-mentioned three-dimensional model data, the color spraying nozzle module 3 includes the color spraying nozzle 31 and the screen member 32, the color spraying nozzle 31 is formed with the nozzle hole 311, the screen member 32 is formed with the screen hole 321, the screen hole 321 is arranged corresponding to the nozzle hole 311, and the area of the screen hole 321 is smaller than the area of the nozzle hole 311. Accordingly, the three-dimensional printer 10 is provided with both functions of depositing and forming the three-dimensional object 100 and coloring the three-dimensional object 100, and the area of the screen hole 321 is smaller than the area of the nozzle hole 311 of the color spraying nozzle 31, so that the color spraying nozzle 31 is able to more efficiently and precisely color the three-dimensional object 100.

Figure 4:
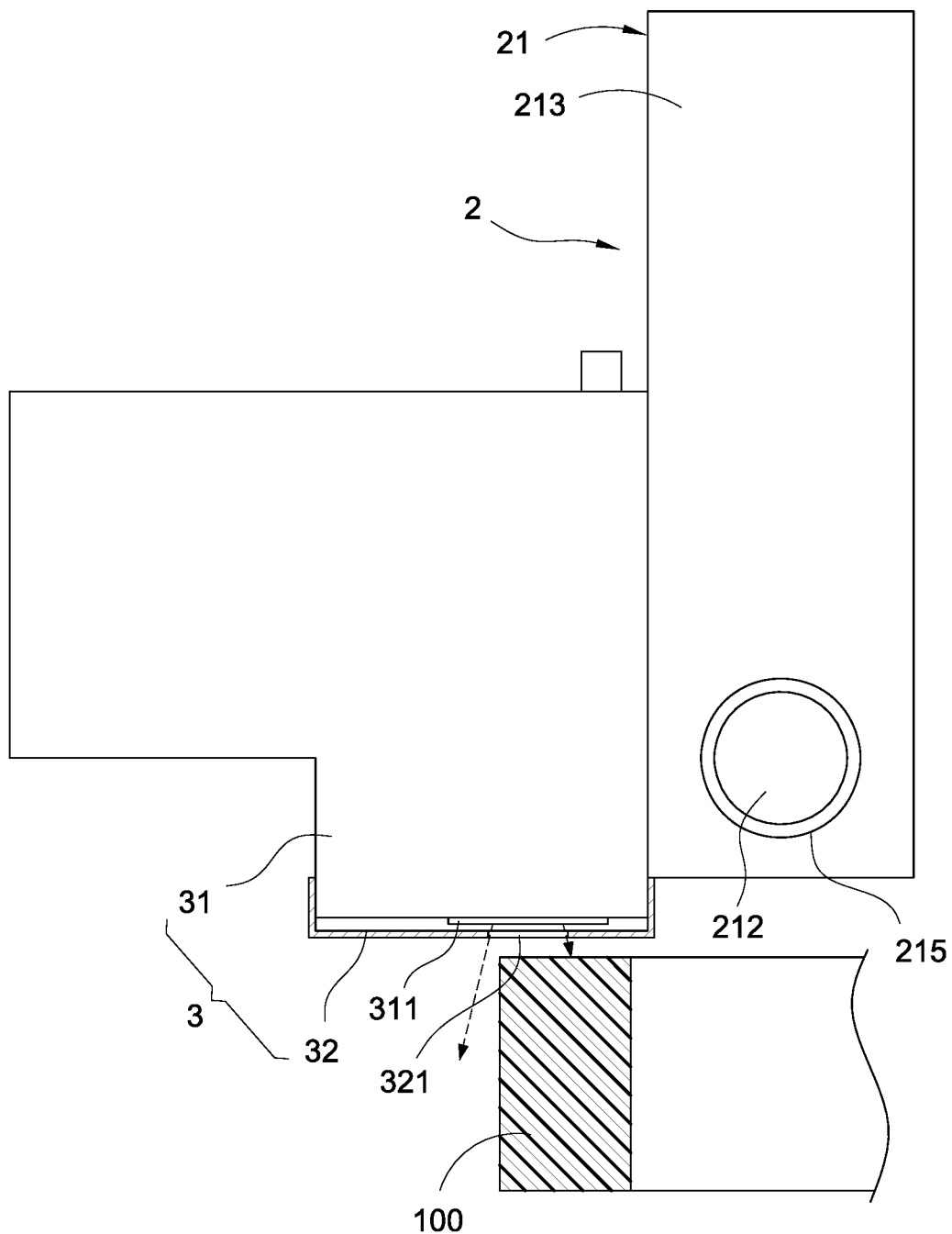
FIG. 4 is a schematic view showing an operating status of the color spraying nozzle module according to the first embodiment of the present invention.

As shown in FIG. 4, the operating status of the three-dimensional printer 10 provided by the present invention is that: the three-dimensional printing module 2 is firstly used for forming the three-dimensional object 100 by a means of depositing multiple layers, then the color spraying nozzle 31 is used for coloring the outer surface of each of the layers of the three-dimensional object 100.

However, the coloring area and angle are rather large due to the dimension of the above-mentioned nozzle hole 311, because the thickness of each of the layers of the three-dimensional object 100 is between 0.1 mm to 0.4 mm, the coloring area and angle of each of the layers of the three-dimensional object 100 are relatively smaller, thus the screen hole 321 is arranged corresponding to the nozzle hole 311, and the length and the width (the area) of the screen hole 321 is smaller than the length and the width (the area) of the nozzle hole 311, so that the screen hole 321 is able to reduce the coloring area of the nozzle hole 311, and the color spraying nozzle 31 is able to more efficiently and precisely color the outer surface of each of the layers of the three-dimensional object 100.

In addition, the processer 4 (please refer to FIG. 1) is able to receive the above-mentioned three-dimensional model data for calculating the color printing route of the color spraying nozzle 31, so the three-dimensional printing module 2 can be firstly used for depositing each of the layers of the three-dimensional object 100, then the moving unit 21 is used for driving the color spraying nozzle 31 to color each of the layers of the three-dimensional object 100.

Moreover, the three-dimensional printing nozzle 22 and the color spraying nozzle 31 are together fastened on the moving unit 21 and moved with the moving unit 21, so that the three-dimensional printer 10 provided by the present invention is enabled to effectively deposit and color the three-dimensional object 100.

Figure 5:
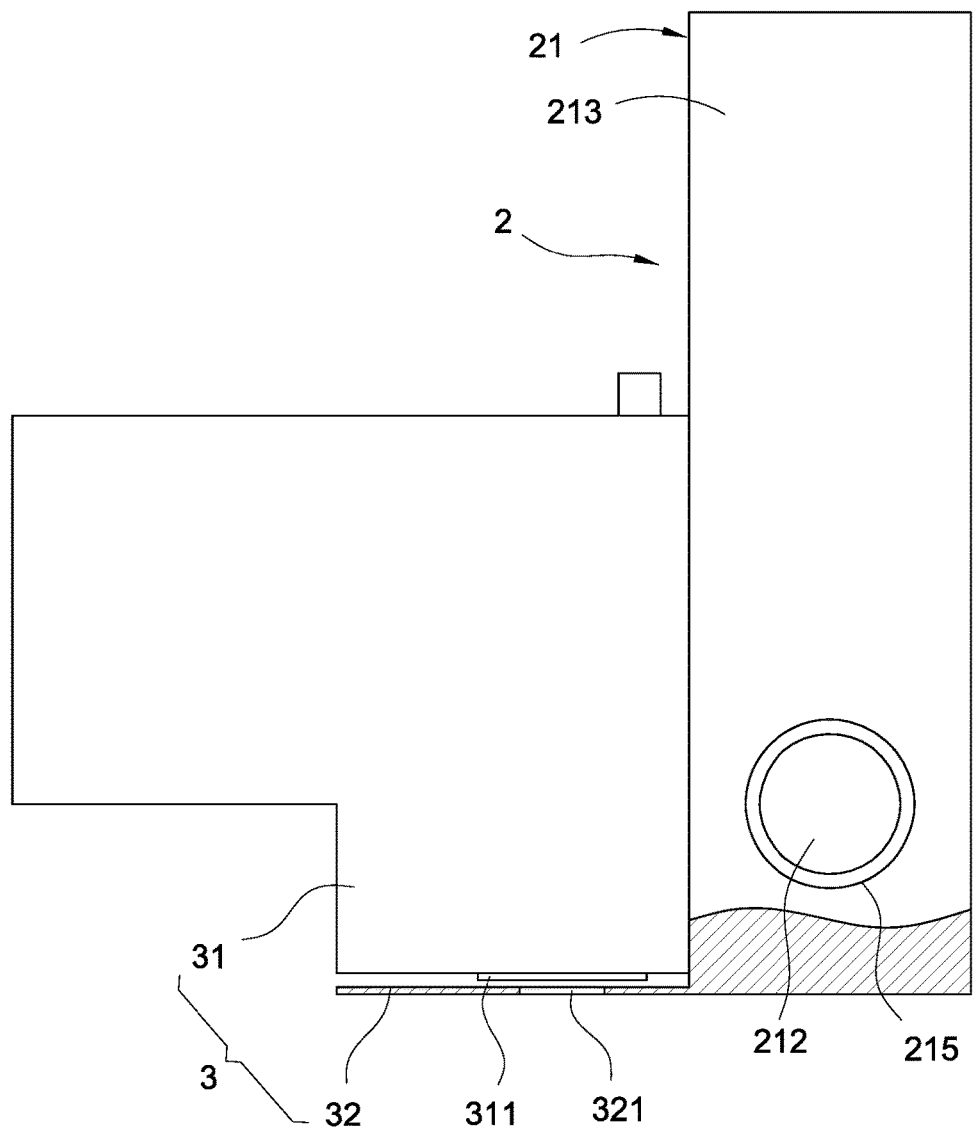
FIG. 5 is a cross sectional view showing the color spraying nozzle module according to a second embodiment of the present invention.

Please refer to FIG. 5, which discloses the color spraying nozzle module 3 according to a second embodiment of the present invention. The second embodiment is substantially the same as the first embodiment, and the difference between the second embodiment and the first embodiment is that the screen member 32 is fastened on the nozzle carrier 213 and served to cover the color spraying nozzle 31. Accordingly, the same functions and effects provided by the first embodiment can also be achieved.

Figure 6:
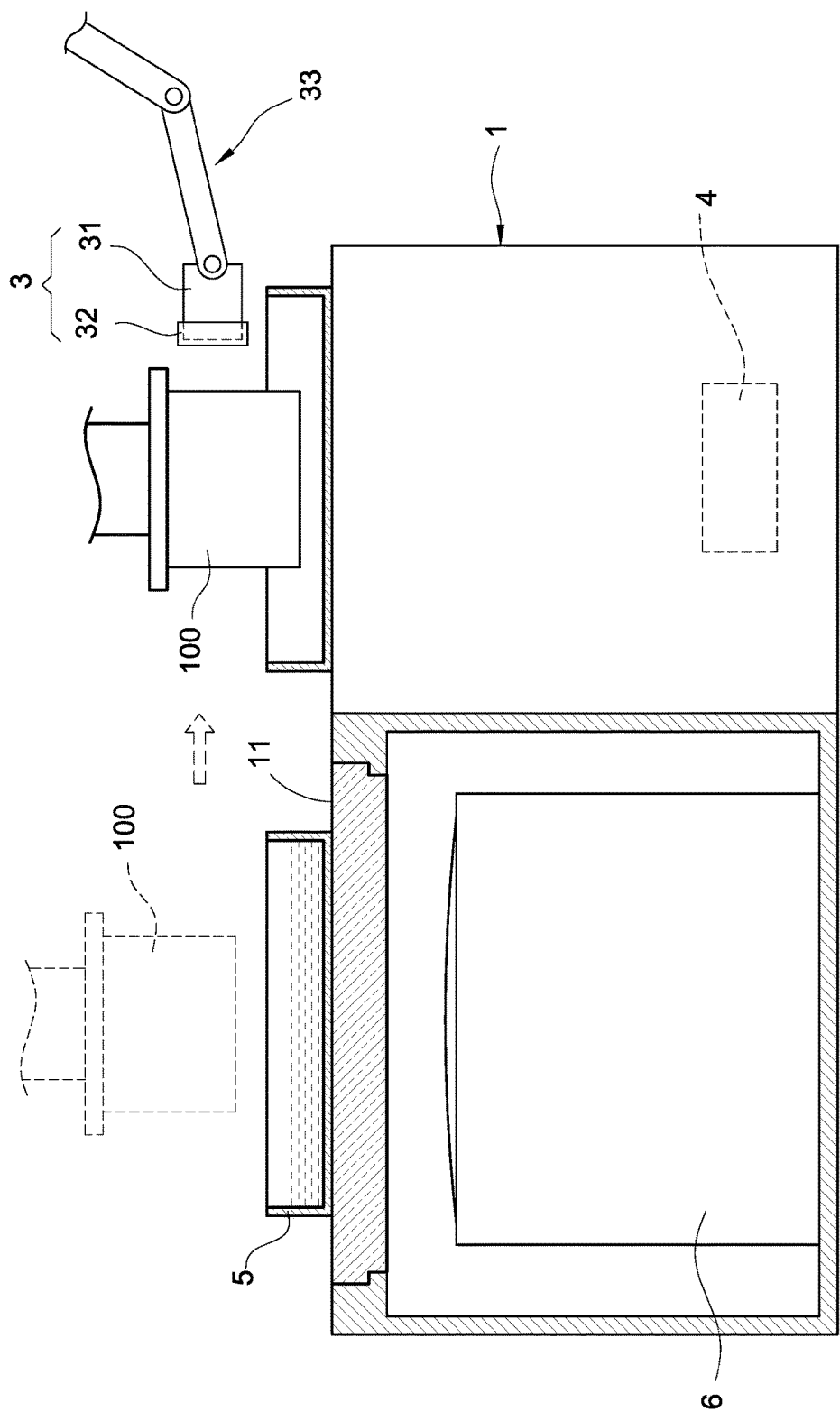
FIG. 6 is a schematic view showing the assembly of the three-dimensional printer according to a third embodiment of the present invention.

Please refer to FIG. 6, which discloses a third embodiment of the three-dimensional printer 10 provided by the present invention. The third embodiment is substantially the same as the first embodiment, and the difference between the third embodiment and the first embodiment is that the three-dimensional printer 10 is a stereolithography apparatus (SLA) three-dimensional printer.

Details are provided as follows. The stereolithography apparatus (SLA) three-dimensional printer is adopted as the three-dimensional printer 10, so the machine mainframe 1 includes a tank 5 and a light source unit 6, and the color spraying nozzle module 3 further includes an actuation mechanism 33 installed on the machine mainframe 1, the color spraying nozzle 31 is fastened on the actuation mechanism 33 and moved with the actuation mechanism 33. Accordingly, the stereolithography apparatus (SLA) three-dimensional printer can be used for firstly forming the three-dimensional object 100 by a means of depositing multiple layers, and the color spraying nozzle 31 and the screen member 32 are used for coloring the outer surface of each of the layers of the three-dimensional object 100 through the actuation mechanism 33, so that the same functions and effects provided by the first embodiment can also be achieved In addition, according to this embodiment, the actuation mechanism 33 is a mechanical arm, but what shall be addressed is that the scope of the present invention is not limited to the above-mentioned mechanical arm; the actuation mechanism 33 can be altered according to actual needs.

Moreover, according to this embodiment, the stereolithography apparatus (SLA) three-dimensional printer is adopted as the three-dimensional printer 10, but all be addressed is that the scope of the present invention is not limited to the above-mentioned, the three-dimensional printer can also be other three-dimensional printers such as fused filament fabrication (FFF), selective laser sintering (SLS), laminated object manufacturing (LOM) and three dimensional printing (3DP).

Figure 7:
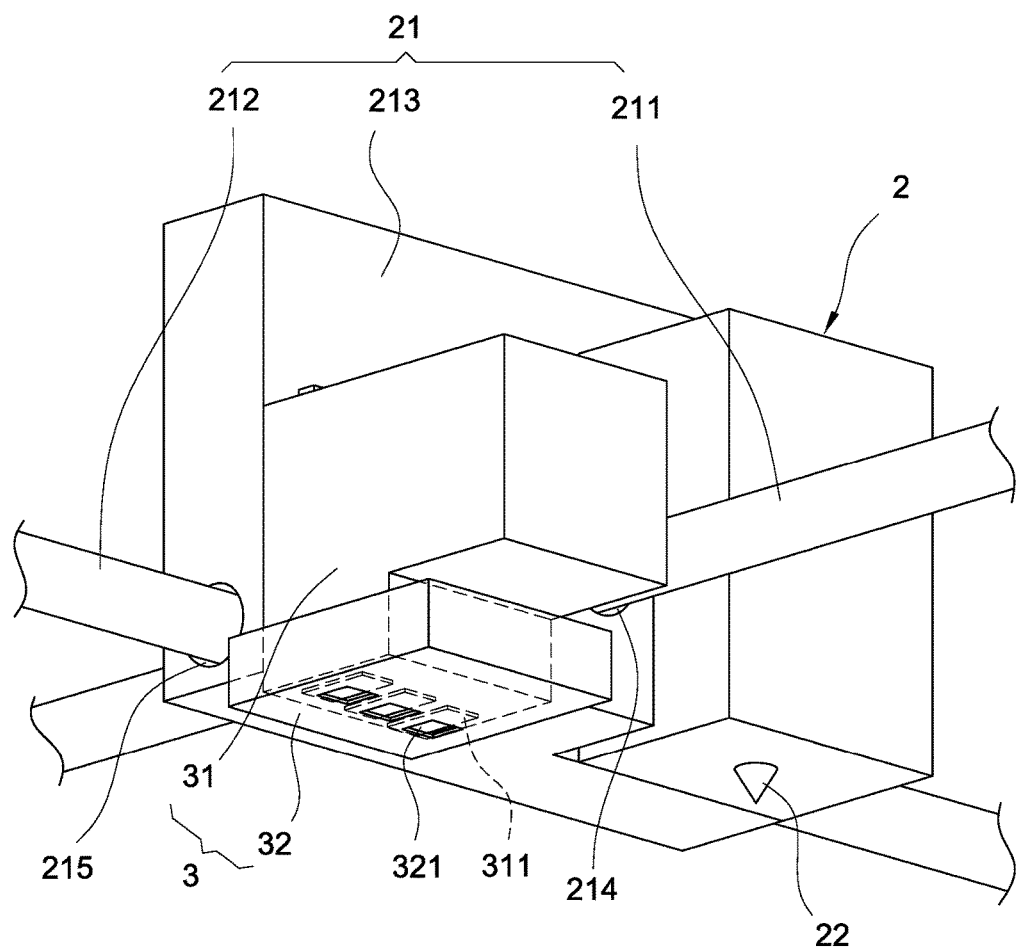
FIG. 7 is a perspective view showing a three-dimensional printing module according to a fourth embodiment of the present invention.
Figure 8:
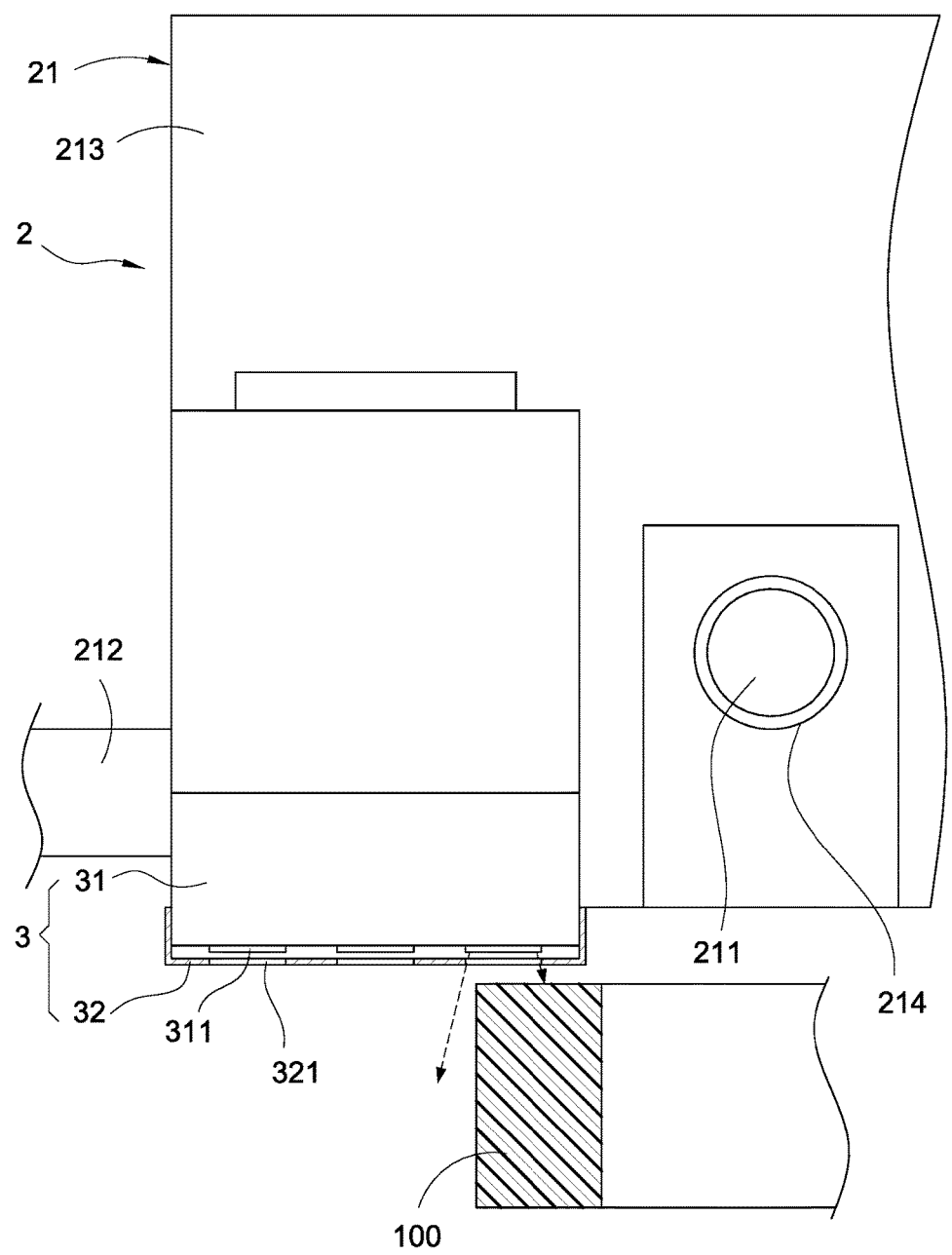
FIG. 8 is a schematic view showing an operating status of the color spraying nozzle module according to the fourth embodiment of the present invention.

Please refer to FIG. 7 and FIG. 8, which discloses a fourth embodiment of the three-dimensional printer 10 provided by the present invention. The fourth embodiment is substantially the same as the first embodiment, and the difference between the fourth embodiment and the first embodiment is that the quantity of the nozzle holes 311 on the same color spraying nozzle 31 is plural, and the quantity of the screen holes 321 on the same screen member 32 is plural.

Details are provided as follows. According to this embodiment, the plural nozzle holes 311 of the color spraying nozzle 31 are a plurality of nozzle holes capable of ejecting single color, each of the screen holes 321 is respectively arranged corresponding to each of the nozzle holes 311, so that the same functions and effects provided by the first embodiment can also be achieved.

Figure 9:
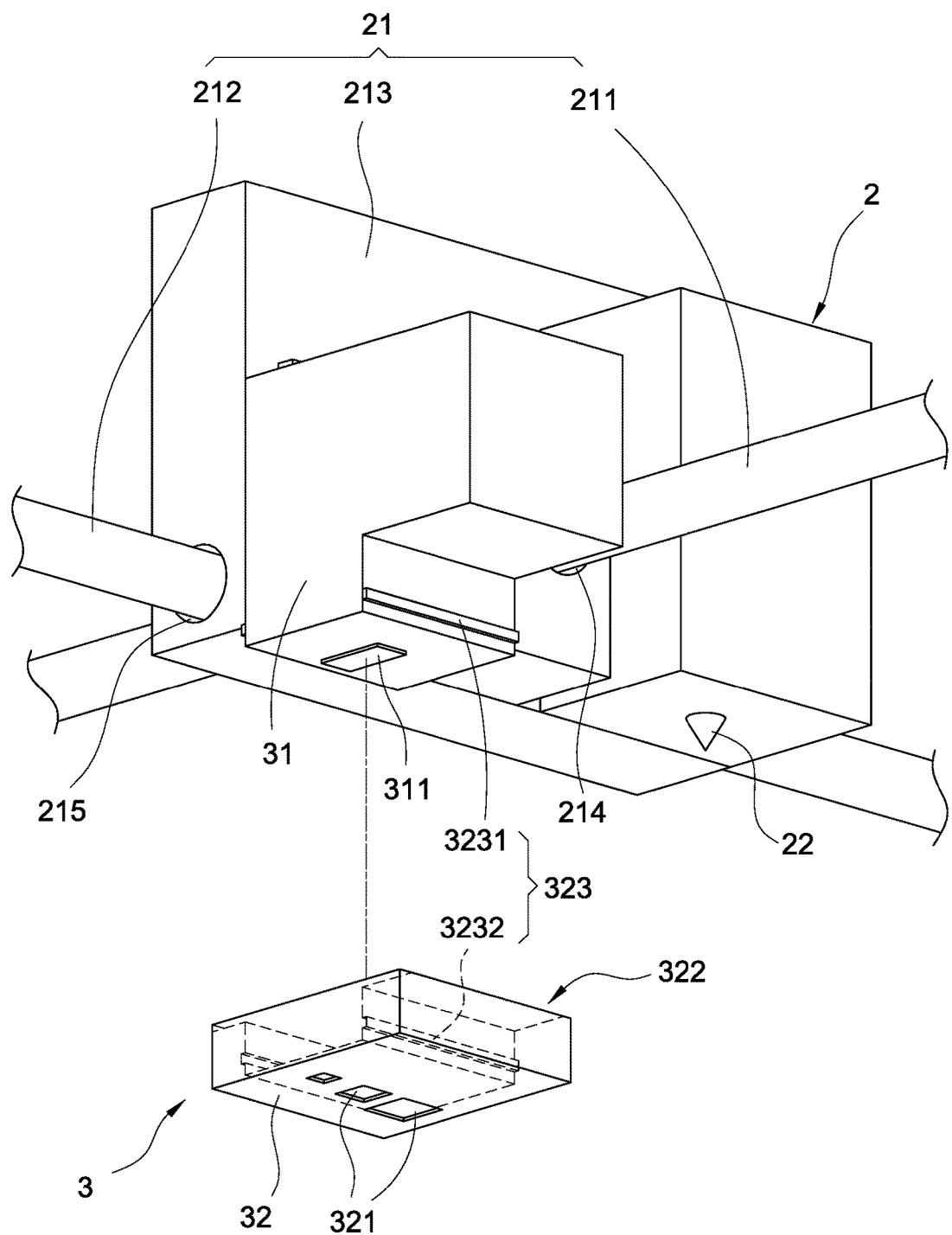
FIG. 9 is a perspective view showing the color spraying nozzle module according to a fifth embodiment of the present invention.

Please refer to FIG. 9, which discloses a fifth embodiment of the three-dimensional printer 10 provided by the present invention. The fifth embodiment is substantially the same as the first embodiment, and the difference between the fifth embodiment and the first embodiment is that the screen member 32 includes an adjusting structure 322 used for adjusting the dimension of the screen hole 321 arranged corresponding to the nozzle hole 311.

Details are provided as follows. The quantity of the screen holes 321 on the same screen member 32 is plural, the dimensions of the plural screen holes 321 are different from each other, the adjusting structure 322 is a mobile member 323 connected between the color spraying nozzle 31 and the screen member 32, the mobile member 323 is able to drive the screen member 32 to slide relative to the color spraying nozzle 31, so that one of the plural screen holes 321 is able to be selected for being arranged corresponding to the nozzle hole 311.

In addition, the mobile member 323 includes a supporter 3231 and a slide rail 3232, the supporter 3231 is formed through being extended from the color spraying nozzle 31, the slide rail 3232 is formed on the screen member 32, the supporter 3231 is able to slide on the slide rail 3232 for driving the screen member 32 to move relative to the nozzle hole 311, so that one of the plural screen holes 321 having different dimensions can be selected for being arranged corresponding to the nozzle hole 311.

Accordingly, because the coloring area and angle of the nozzle hole 311 are relatively larger and the dimension thereof is fixed, the coloring area and angle required at a corner or an edge defined at the coloring location of the three-dimensional object to be colored are relatively smaller, and the coloring area and angle required on a surface defined at the coloring location of the three-dimensional object to be colored are relatively larger, different coloring areas and angles are required with respect to the different coloring locations of the three-dimensional object, the screen member 32 is able to utilize the adjusting structure 322 to select the screen hole 321 with the required dimension from the plural screen holes 321 having different dimensions for being arranged corresponding to the nozzle hole 311, so that the screen member 32 is able to adjust the dimension of the screen hole 321 so as to adjust the coloring area and angle of the nozzle hole 311, thereby allowing the three-dimensional printer 10 to be provided with an advantage of precisely spraying and coating.

Figure 10:
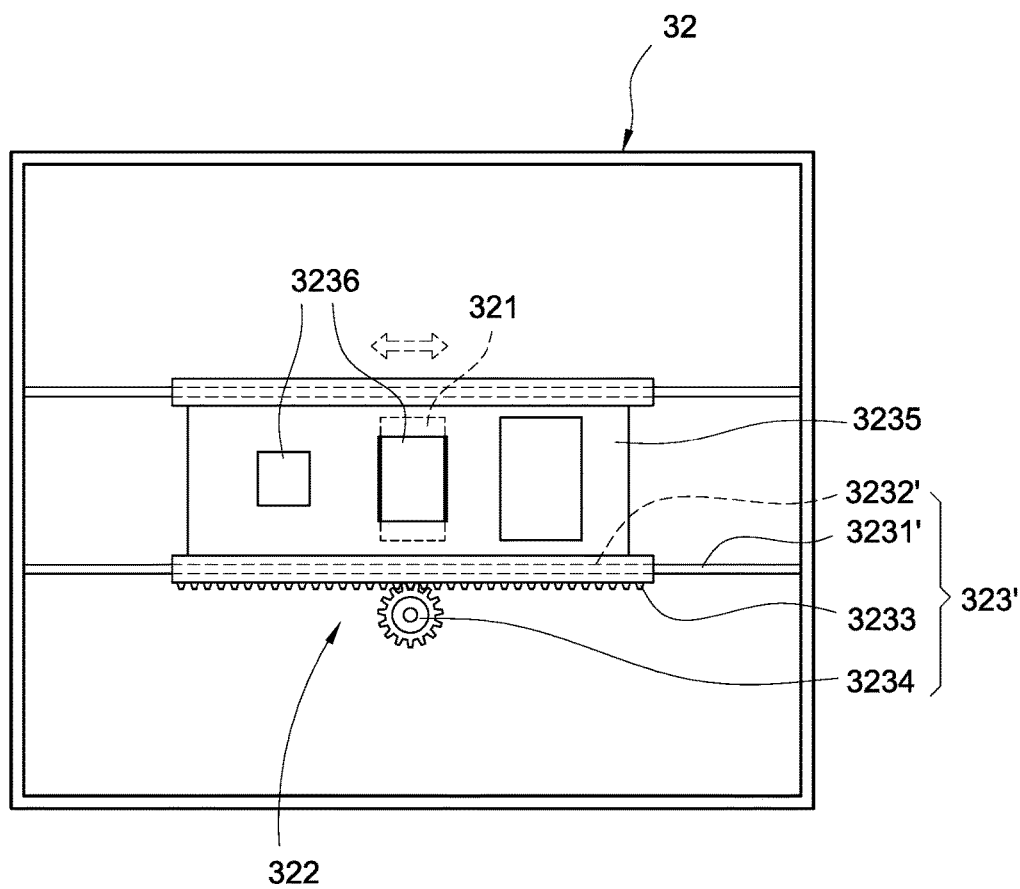
FIG. 10 is a schematic view showing an operating status of the color spraying nozzle module according to a sixth embodiment of the present invention.

Please refer to FIG. 10, which discloses a sixth embodiment of the three-dimensional printer 10 provided by the present invention. The sixth embodiment is substantially the same as the fifth embodiment, and the difference between the sixth embodiment and the fifth embodiment is that the adjusting structure 322 includes a mobile member 323' and a moving plate 3235.

Details are provided as follows. The moving plate 3235 is arranged corresponding to the screen hole 321 and formed with a plurality of hollow holes 3236 having different dimensions, the mobile member 323' is connected between the moving plate 3235 and the screen member 32, the mobile member 323' is electrically connected to the processor 4 (please refer to FIG. 1) and capable of driving the moving plate 3235 to slide relative to the screen hole 321, so that one of the plural hollow holes 3236 is able to be selected for being arranged corresponding to the screen hole 321.

In addition, the mobile member 323' includes a supporter 3231', a slide rail 3232', a rack 3233 and a driving gear 3234, the supporter 3231' is formed through being extended from the screen member 32, the slide rail 3232' and the rack 3233 are respectively formed on the moving plate 3235, the supporter 3231' is able to slide on the slide rail 3232', the driving gear 3234 is electrically connected to the processor 4 (please refer to FIG. 1) and engaged with the rack 3233 for the purpose of transmission, the processor 4 (please refer to FIG. 1) is able to receive the above-mentioned three-dimensional model data and calculate the data for controlling the driving gear 3234 to rotate, so that the moving plate 3235 is driven to move relative to the screen hole 321, thereby enabling the hollow hole 3236 with the required dimension to be selected from the plural hollow holes 3236 having different dimensions for being arranged corresponding to the screen hole 321.

Accordingly, the screen member 32 can utilize the adjusting structure 322 to select the hollow hole 3236 with the required dimension from the plural hollow holes 3236 having different dimensions for being arranged corresponding to the screen hole 321, so that the screen member 32 is able to adjust the dimension of the screen hole 321 so as to adjust the coloring area and angle of the nozzle hole 311 (please refer to FIG. 9), thereby allowing the three-dimensional printer 10 to be provided with an advantage of precisely spraying and coating.

Figure 11:
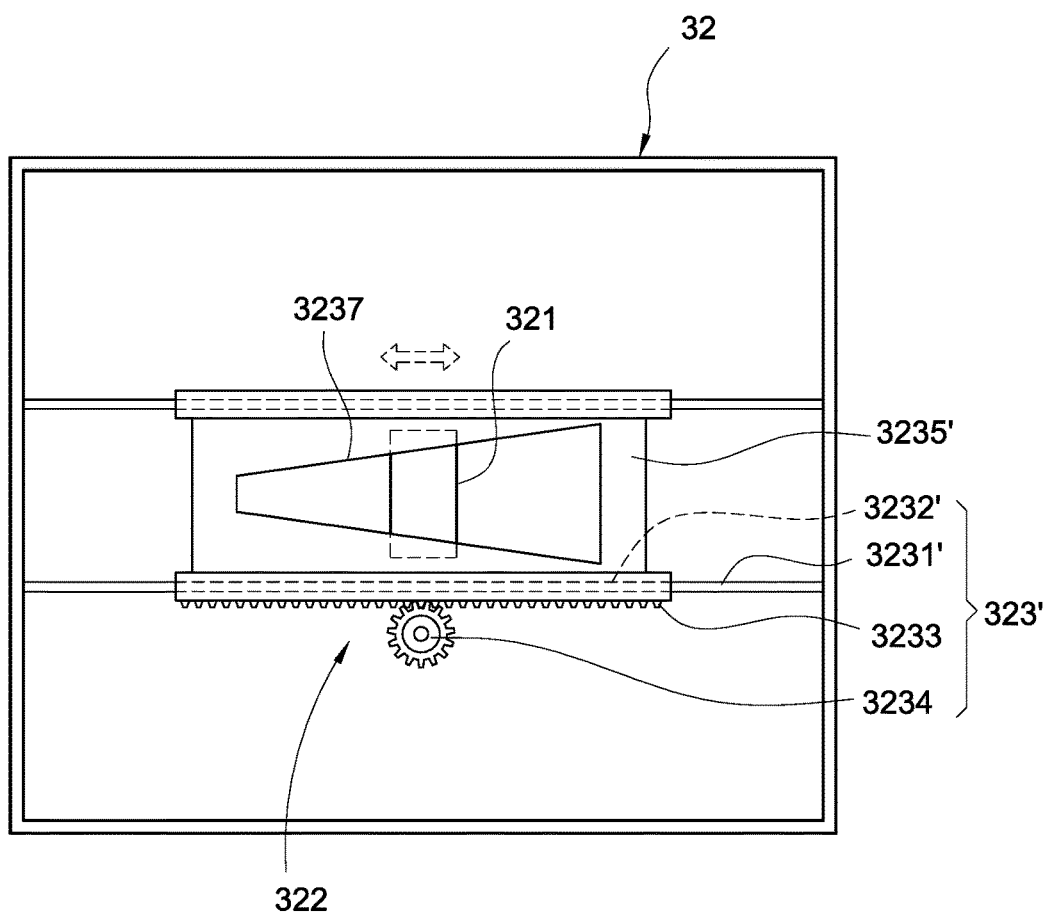
FIG. 11 is a schematic view showing an operating status of the color spraying nozzle module according to a seventh embodiment of the present invention.

Please refer to FIG. 11, which discloses a seventh embodiment of the three-dimensional printer 10 provided by the present invention. The seventh embodiment is substantially the same as the sixth embodiment, and the difference between the seventh embodiment and the sixth embodiment is that a moving plate 3235' is arranged corresponding to the screen hole 321 and formed with a trapezoid elongated hole 3237.

Details are provided as follows. The mobile member 323' is connected between the moving plate 3235' and the screen member 32, the mobile member 323' is electrically connected to the processor 4 (please refer to FIG. 1) and capable of driving the moving plate 3235' to slide relative to the screen hole 321, so that the trapezoid elongated hole 3237 is able to be driven to slide relative to the screen hole 321.

Figure 12:
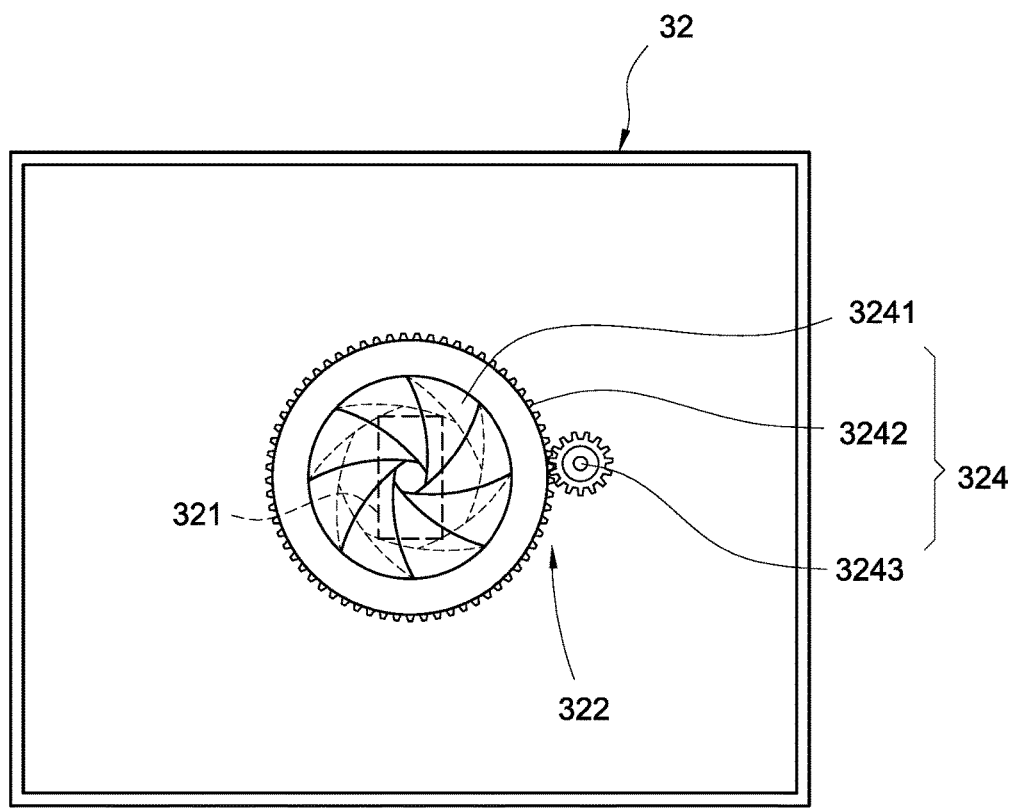
FIG. 12 is a schematic view showing an operating status of the color spraying nozzle module according to an eighth embodiment of the present invention.

Accordingly, during the sliding process of the trapezoid elongated hole 3237 relative to the screen hole 321, because the width of the trapezoid elongated hole 3237 itself is gradually reduced, the smaller width of the trapezoid elongated hole 3237 being arranged corresponding to the screen hole 321 is able to limit the coloring area and angle of the nozzle hole 311 (please refer to FIG. 9), the larger width of the trapezoid elongated hole 3237 being arranged corresponding to the screen hole 321 is able to maintain the coloring area and angle of the nozzle hole 311 (please refer to FIG. 9), so that the coloring area and angle of the nozzle hole 311 (please refer to FIG. 9) can be adjusted, thereby allowing the three-dimensional printer 10 to be provided with an advantage of precisely spraying and coating. Please refer to FIG. 12, which discloses an eighth embodiment of the three-dimensional printer 10 provided by the present invention. The eighth embodiment is substantially the same as the fifth embodiment, and the difference between the eighth embodiment and the fifth embodiment is that the adjusting structure 322 is a hole shielding member 324 arranged corresponding to the screen hole 321, the hole shielding member 324 is able to partially shield, fully shield or fully exposed the screen hole 321.

Details are provided as follows. The hole shielding member 324 includes a rotary shutter 3241, a rack 3242 and a driving gear 3243, the rotary shutter 3241 is arranged corresponding to the screen hole 321, the rack 3242 is formed on the rotary shutter 3241, the driving gear 3243 is electrically connected to the processor 4 (please refer to FIG. 1) and engaged with the rack 3242 for the purpose of transmission, the processor 4 (please refer to FIG. 1) is able to receive the above-mentioned three-dimensional model data and calculate the data for controlling the driving gear 3243 to rotate, so that an aperture of the rotary shutter 3241 can be controlled for being opened or closed, thereby enabling the aperture of the rotary shutter 3241 to partially shield, fully shield or fully expose the screen hole 321.

Accordingly, the smaller aperture of the rotary shutter 3241 is able to limit the coloring area and angle of the nozzle hole 311 (please refer to FIG. 9) and the screen hole 321, the larger aperture of the rotary shutter 3241 is able to maintain the coloring area and angle of the nozzle hole 311 (please refer to FIG. 9) and the screen hole 321, so that the coloring area and angle of the nozzle hole 311 (please refer to FIG. 9) can be adjusted, thereby allowing the three-dimensional printer 10 to be provided with an advantage of precisely spraying and coating.

Figure 13:
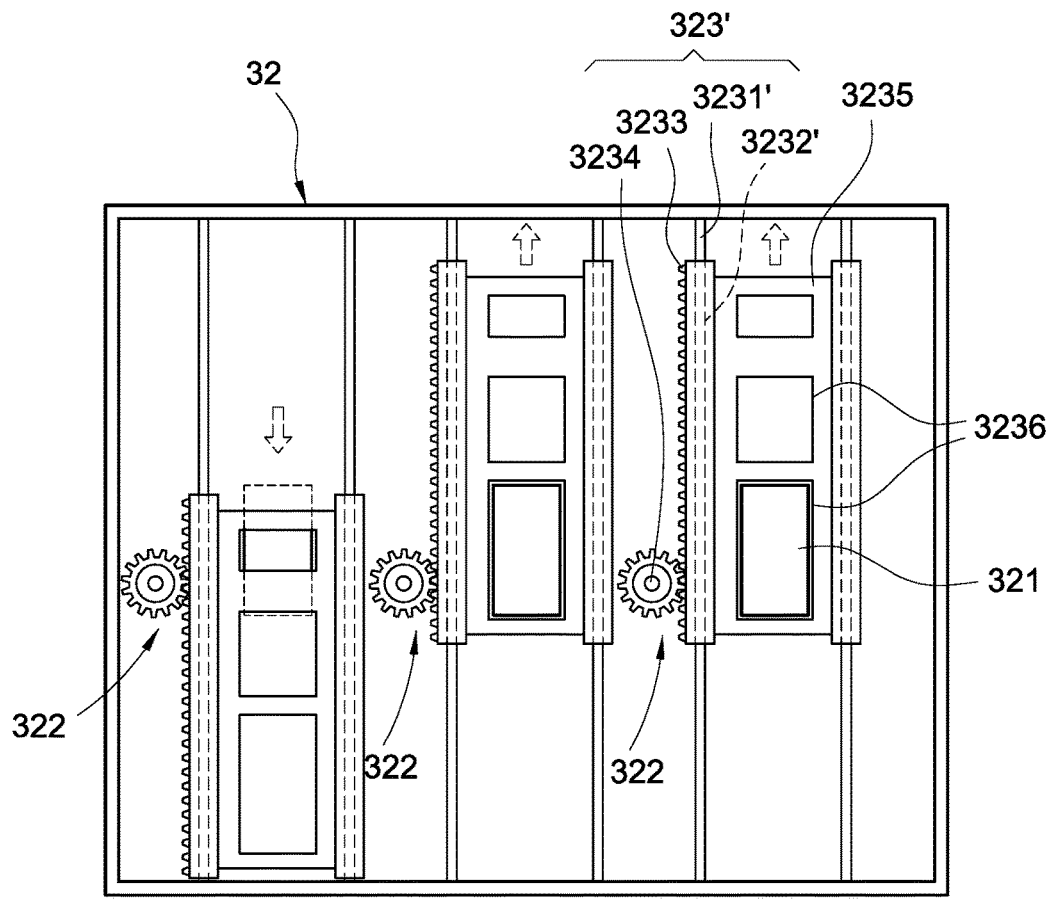
FIG. 13 is a schematic view showing an operating status of the color spraying nozzle module according to a ninth embodiment of the present invention.
Figure 14:
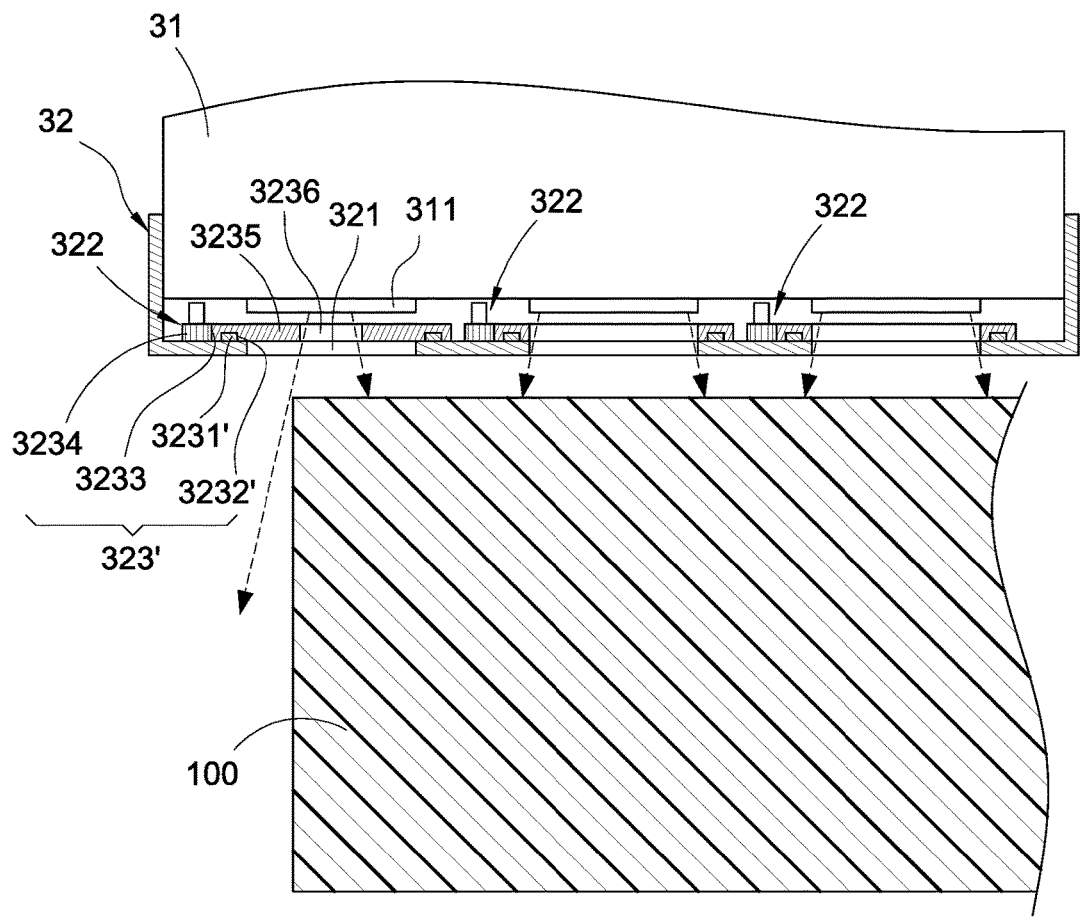
FIG. 14 is a schematic view showing another operating status of the color spraying nozzle module according to the ninth embodiment of the present invention.

Please refer to FIG. 13 and FIG. 14, which discloses a ninth embodiment of the three-dimensional printer 10 provided by the present invention. The ninth embodiment is substantially the same as the sixth embodiment, and the difference between the ninth embodiment and the sixth embodiment is that the quantity of the nozzle holes 311 on the same color spraying nozzle 31 is plural, the quantity of the screen members 32 is plural, and each of the screen members 32 is respectively arranged corresponding to each of the nozzle holes 311.

Details are provided as follows. Each of the screen members 32 can utilize the adjusting structure 322 to adjust the coloring area and angle of each of the nozzle holes 311. When the coloring location of the three-dimensional object to be colored is defined at an corner or an edge, the dimension of the screen hole 321 arranged corresponding to the nozzle hole 311 is reduced for limiting the coloring area and angle of the nozzle hole 311; when the coloring location of the three-dimensional object to be colored is defined on a surface, the dimension of the screen hole 321 arranged corresponding to the nozzle hole 311 is enlarged for maintaining the coloring area and angle of the nozzle hole 311.

So based on the same principle, the quantity of nozzle holes 311 on the same color spraying nozzle 31 disclosed in the fifth, the seventh and the eighth embodiment can be plural, the quantity of the screen members 32 can be plural, and each of the screen members 32 is respectively arranged corresponding to each of the nozzle holes 311.

Figure 15:
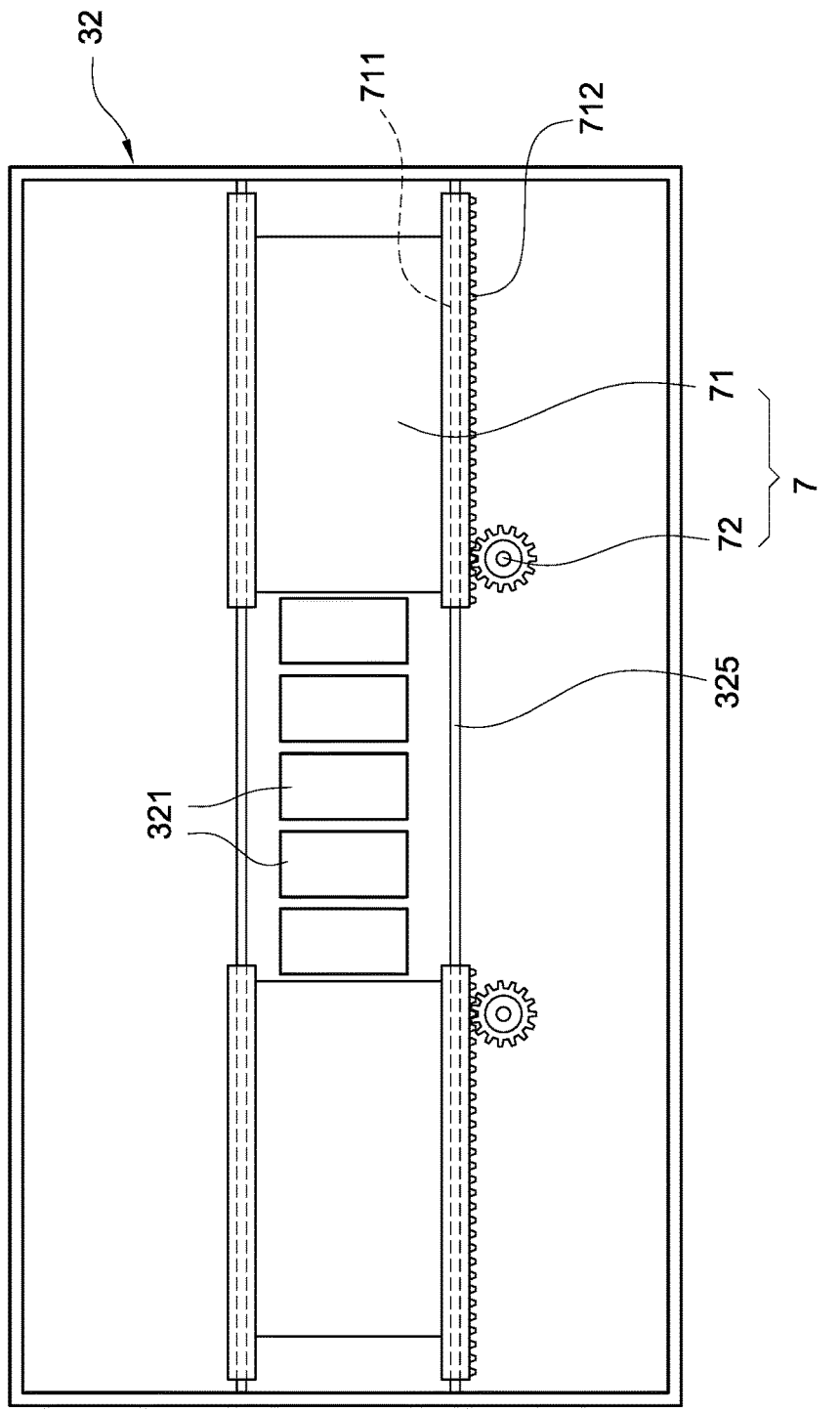
FIG. 15 is a schematic view showing an operating status of the color spraying nozzle module according to a tenth embodiment of the present invention.
Figure 16:
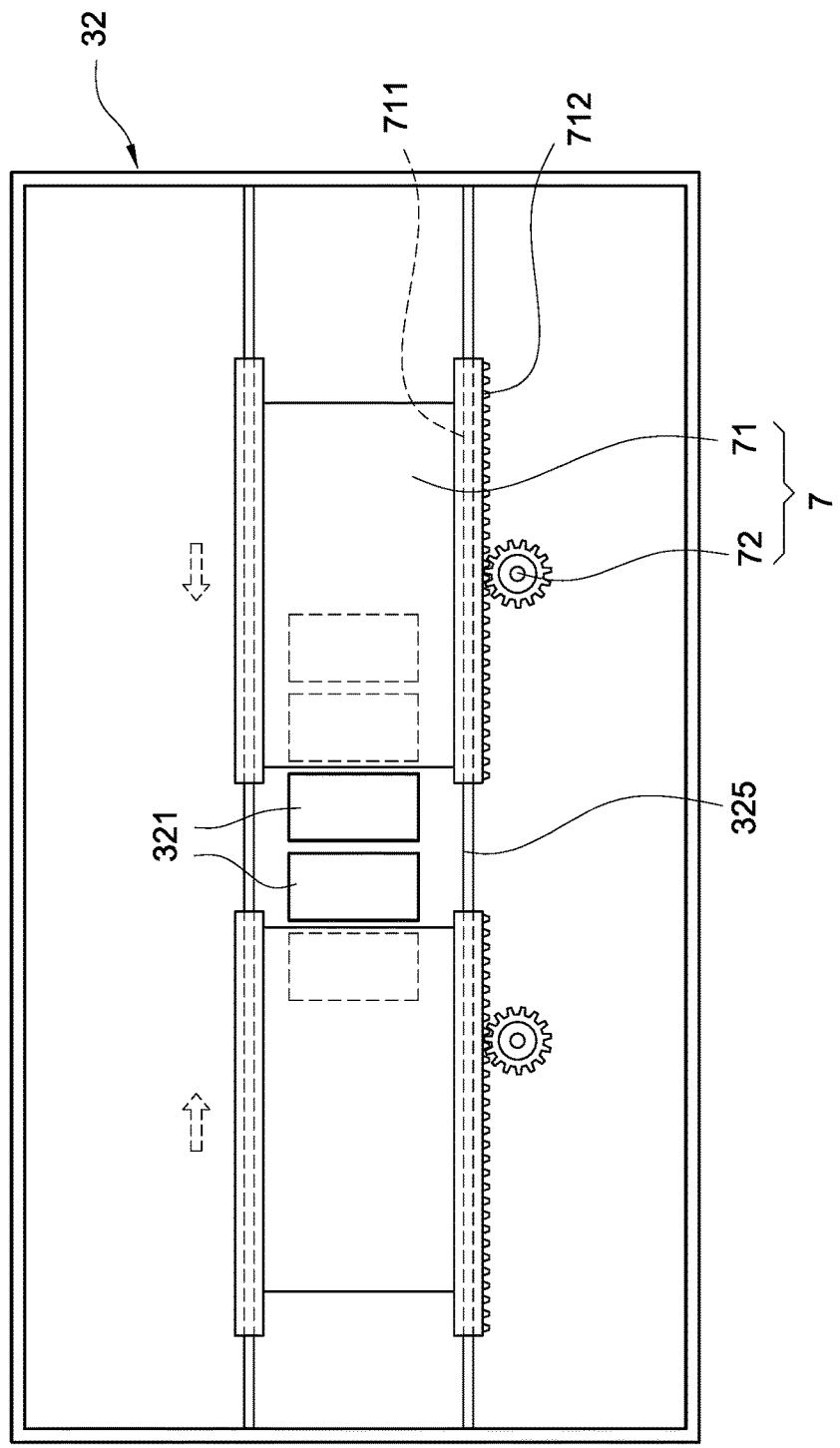
FIG. 16 is a schematic view showing another operating status of the color spraying nozzle module according to the tenth embodiment of the present invention.

Please refer to FIG. 15 and FIG. 16, which discloses a tenth embodiment of the three-dimensional printer 10 provided by the present invention. The tenth embodiment is substantially the same as the fourth embodiment, and the difference between the tenth embodiment and the fourth embodiment is that the three-dimensional printer 10 provided by the present invention further includes a cover structure 7.

Details are provided as follows. The quantity of nozzle holes 311 on the same color spraying nozzle 31 is plural (please refer to FIG. 7 and FIG. 8), the quantity of the screen holes 321 is plural, and each of the screen holes 321 is respectively arranged corresponding to each of the nozzle holes 311 (please refer to FIG. 7 and FIG. 8), the cover structure 7 is arranged corresponding to the plural screen holes 321, and the cover structure 7 is able to partially cover, fully cover or fully expose the plural screen holes 321.

In addition, the cover structure 7 includes one or a plurality of mobile cover gates 71 and one or a plurality of driving gears 72, the screen member 32 includes a supporter 325, the mobile cover gate 71 includes a slide rail 711 and a rack 712, the supporter 325 is able to slide on the slide rail 711, the driving gear 72 is electrically connected to the processor 4 (as shown in FIG. 1) and engaged with the rack 712 for the purpose of transmission, the processor 4 (please refer to FIG. 1) is able to receive the above-mentioned three-dimensional model data and calculate the data for controlling the driving gear 72 to rotate, so that the mobile cover gate 71 is driven to slide relative to the plural screen holes 321 for enabling the mobile cover gate 71 to partially cover, fully cover or fully expose the plural screen hole 321.

Accordingly, the mobile cover gate 71 is able to partially cover, fully cover or fully expose the plural screen hole 321 so as to partially cover, fully cover or fully expose the plural nozzle holes 311 (please refer to FIG. 7 and FIG. 8), thereby limiting the colors and quantity of the nozzle holes 311 for satisfying a desired coloring plan.

Based on what has been disclosed above, the three-dimensional printer provided by the present invention is novel and more practical in use comparing to prior art.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A three-dimensional printer for forming a three-dimensional object comprising:
    a machine mainframe with a carrying plane;
    a three-dimensional printing module positioned on the machine mainframe, and configured for forming the three-dimensional object on the carrying plane according to a three-dimensional model data; and
    a color spraying nozzle module positioned on the machine mainframe and configured for coloring a surface of the three-dimensional object according to the three-dimensional model data, wherein the color spraying nozzle module includes at least one color spraying nozzle and at least one screen member, the color spraying nozzle includes at least one nozzle hole, the screen member includes at least one screen hole, the screen hole is arranged corresponding to the nozzle hole, and an area of the screen hole is smaller than that of the nozzle hole,
    wherein the screen member includes an adjusting structure configured for adjusting the size of the screen hole arranged corresponding to the nozzle hole, the adjusting structure includes a mobile member connected between the color spraying nozzle and the screen member, the mobile member is configured to drive the screen member to slide relative to the color spraying nozzle, so that one of the plurality of screen holes is selected for being arranged corresponding to the nozzle hole.

2. The three-dimensional printer according to claim 1, wherein the screen member includes a plurality of screen holes, the sizes of the plurality of screen holes are different from each other.

3. The three-dimensional printer according to claim 2, wherein the mobile member includes a supporter and a slide rail, the supporter being extended from the color spraying nozzle, the slide rail is positioned on the screen member, and the supporter is configured to slide on the slide rail.

4. The three-dimensional printer according to claim 1, wherein the adjusting structure includes a mobile member and a moving plate, the moving plate is arranged corresponding to the screen hole and includes a plurality of hollow holes having different dimensions, the mobile member is connected between the moving plate and the screen member, the mobile member is configured to drive the moving plate to slide relative to the screen hole, so that one of the plurality of hollow holes is selected for being arranged corresponding to the screen hole.

5. The three-dimensional printer according to claim 4, wherein the mobile member includes a supporter, a slide rail, a rack and a driving gear, the supporter being extended from the screen member, the slide rail and the rack are respectively positioned on the moving plate, the supporter is configured to slide on the slide rail, and the driving gear is connected with the rack for the purpose of transmission.

6. The three-dimensional printer according to claim 1, wherein the adjusting structure includes a mobile member and a moving plate, the moving plate is arranged corresponding to the screen hole and includes a trapezoid elongated hole, the mobile member is connected between the moving plate and the screen member, the mobile member is configured to drive the moving plate to slide relative to the screen hole, so that the trapezoid elongated hole is driven to slide relative to the screen hole.

7. The three-dimensional printer according to claim 6, wherein the mobile member includes a supporter, a slide rail, a rack and a driving gear, the supporter being extended from the screen member, the slide rail and the rack are respectively positioned on the moving plate, the supporter is configured to slide on the slide rail, and the driving gear is connected with the rack for the purpose of transmission.

8. The three-dimensional printer according to claim 1, wherein the adjusting structure is a hole shielding member arranged corresponding to the screen hole, and the hole shielding member is configured to partially shield, fully shield or fully exposed the screen hole.

9. The three-dimensional printer according to claim 8, wherein the hole shielding member includes a rotary shutter, a rack and a driving gear, the rotary shutter is arranged corresponding to the screen hole, the rack is positioned on the rotary shutter, the driving gear is connected with the rack for the purpose of transmission, so that the rotary shutter is configured to be opened or closed.

10. The three-dimensional printer according to claim 1, further including a cover structure, a plurality of the nozzle holes formed on the color spraying nozzle and a plurality of the screen holes, wherein each of the screen holes is arranged corresponding to each of the nozzle holes, the cover structure is arranged corresponding to the plurality of screen holes, and the cover structure is configured to partially cover, fully cover or fully expose the plurality of screen holes.

11. The three-dimensional printer according to claim 10, wherein the cover structure includes at least one mobile cover gate and at least one driving gear, the screen member includes a supporter, the mobile cover gate includes a slide rail and a rack, the supporter is configured to slide on the slide rail, the driving gear is connected with the rack for the purpose of transmission, so that the mobile cover gate slide to the plurality of screen holes.

12. The three-dimensional printer according to claim 1, wherein the area of screen hole, a length of the screen hole is smaller than that of the nozzle hole, and a width of the screen hole is smaller than that of the nozzle hole.

13. The three-dimensional printer according to claim 1, wherein the three-dimensional printing module includes a moving unit and a three-dimensional printing nozzle, the moving unit is positioned on the machine mainframe, and the three-dimensional printing nozzle is positioned on the moving unit and moved with the moving unit.

14. The three-dimensional printer according to claim 13, wherein the color spraying nozzle is positioned on the moving unit and moved with the moving unit.

15. The three-dimensional printer according to claim 14, wherein the moving unit includes a first rod member, a second rod member and a nozzle carrier, the nozzle carrier includes a first hole and a second hole perpendicular to each other, the first rod member is positioned in the first hole and configured of sliding therein, the second rod member is positioned in the second hole and configured of sliding therein, and the three-dimensional printing nozzle is positioned on the nozzle carrier and moved with the nozzle carrier.

16. The three-dimensional printer according to claim 15, wherein the color spraying nozzle is positioned on the nozzle carrier and moved with the nozzle carrier.

17. The three-dimensional printer according to claim 1, wherein the color spraying nozzle module further includes an actuation mechanism positioned on the machine mainframe, and the color spraying nozzle is positioned on the actuation mechanism and moved with the actuation mechanism.

18. The three-dimensional printer according to claim 1, wherein the screen member is positioned on the color spraying nozzle and configured to cover the color spraying nozzle.

19. The three-dimensional printer according to claim 1, further including a processor connected to the three-dimensional printing module and the color spraying nozzle module, wherein the processor is configured for receiving the three-dimensional model data and calculating a color printing route of the color spraying nozzle.

\* \* \* \* \*